Patented Apr. 21, 1942

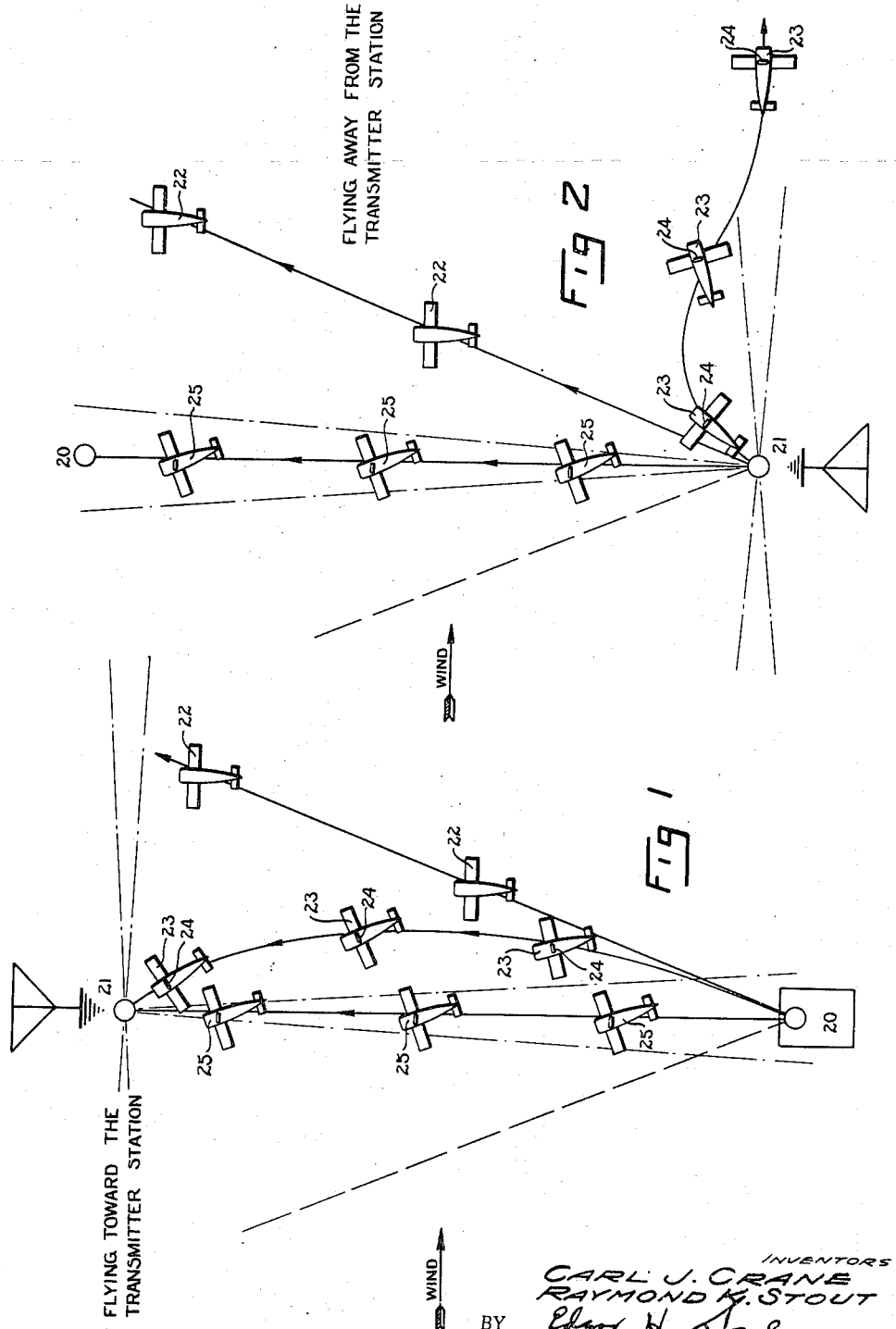

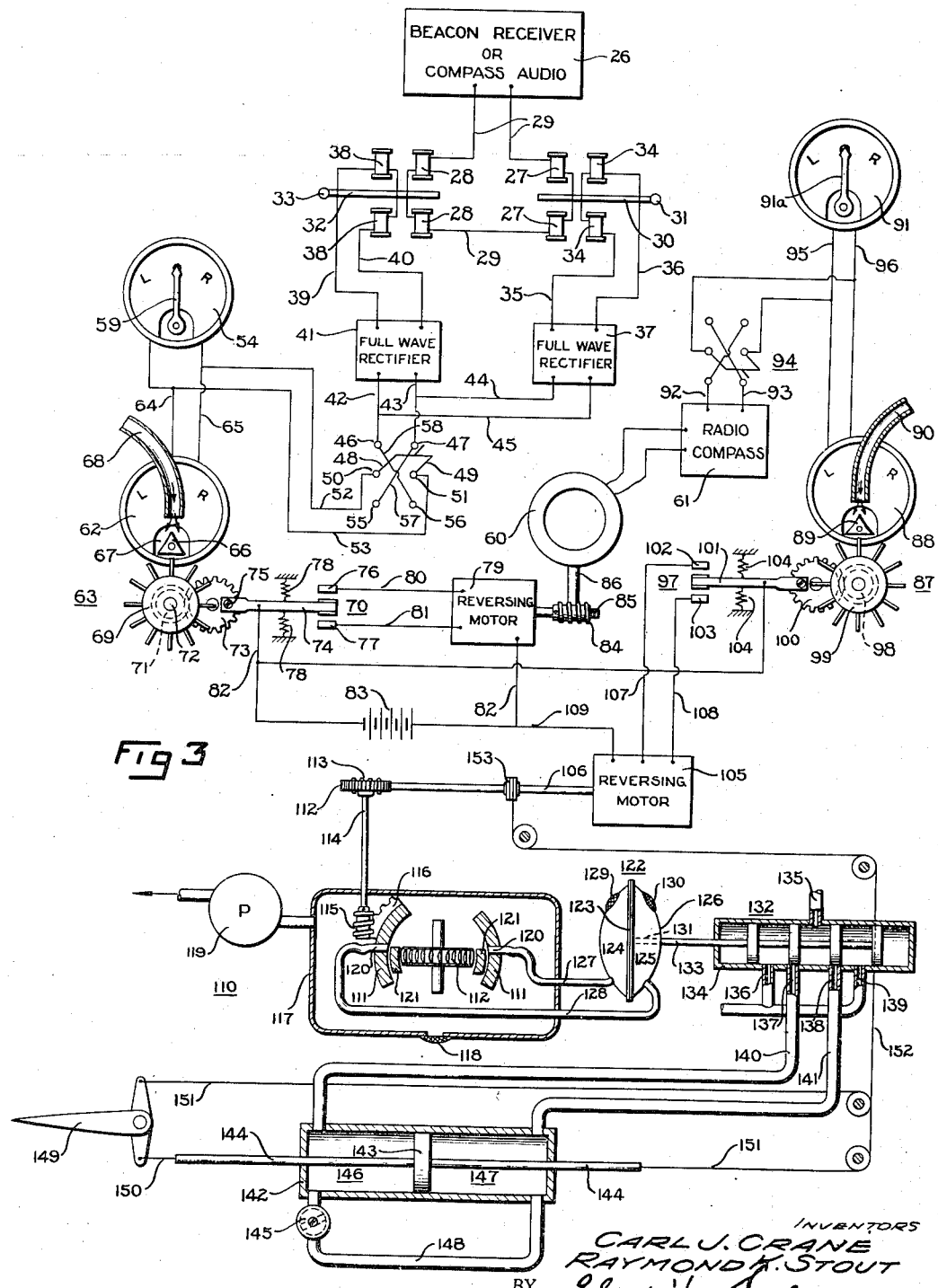

2,280,117

UNITED STATES PATENT OFFICE 2,280,117

DRIFT CORRECTION MODULATED BEAM

Carl J. Crane and Raymond K. Stout, Dayton, Ohio

Application October 18, 1939, Serial No. 300,072

12 Claims. (Cl. 172—282)

This invention relates to apparatus for steering vehicles such as aircraft or marine vessels, and more particularly to means for correcting the course of a vehicle to compensate for drift.

Direction finders or radio compasses having suitable directive antennae are widely used in aerial and marine navigation in combination with suitable means for indicating when a craft is on or off a desired course. When progressing towards a transmitting station, a pilot can manually maintain the craft upon the course in response to the indications received, or the indications may be employed to control an automatic pilot, for example, a "gyroscopic pilot." The pilot, however, in the event of a cross wind or marine current, will be unable to hold the craft upon the desired straight line course but instead will introduce a succession of corrections to the craft's heading which will maintain a perpendicular relation between the plane of the directive antenna and a line extending to the transmitter. This succession of corrections, whether introduced manually or automatically, will cause the craft to move in a curved path instead of in the straight line from the point of departure to the destination.

One of the objects of the present invention is to provide novel and improved means for automatically guiding a vehicle in a straight line course toward or away from a radio transmitter.

Another object is to provide novel means for automatically maintaining a vehicle upon a straight line course, the vehicle being subject to cross currents of varying speeds.

A still further object is to combine a radio compass with means which are responsive to received radiant energy and which are effective to introduce an azimuth correction in the setting of a directive antenna of said radio compass in order that the heading of a vehicle upon which the combination is mounted may be corrected to compensate for drift.

Another object is to provide novel apparatus of the above character which acts quickly and positively to correct a craft's heading to compensate for a cross current when the current first acts upon the craft.

A further object is to provide novel apparatus of the above character which will relieve a human pilot of the burden of constant supervision of navigational instruments.

The above and other objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views, Fig. 1 is a diagrammatic representation of several types of flight with the common objective being a radio transmitter, one of which types is in accordance with the present invention;

Fig. 2 is a similar representation of the same types of flight, proceeding away from the transmitter; and, Fig. 3 is a schematic diagram of one embodiment of the invention;

The form of the invention illustrated in the accompanying drawings, by way of example, is a device for maintaining a vehicle such as an aircraft or marine vessel upon a straight line course to a desired destination and for introducing a correction to the heading of such a vehicle to compensate for the effect of cross winds or marine currents. The apparatus comprises control surface governing means for maintaining the craft upon a predetermined heading. In combination with the control surface governing means there is employed, for example, a radio compass having a directional antenna which compass is operatively connected to the control surface governing means and influences the latter to change the attitude of the craft, whereby a predetermined angular relation is maintained between the directional antenna and a transmitting station. In order that the heading of the craft may be corrected to compensate for drift in such a manner that a straight line course to the destination will be followed, means are provided which are responsive to movement of the craft relative to a beam of radiant energy produced at the destination, for example, a radio beacon receiver, which by suitable means introduces corrections to the angular relation of the directional antenna relative to the craft.

In Fig. 1 there are illustrated the lines of flight of three vehicles such as aircraft, each of which has a common point of departure 20 and a common objective 21, the latter being a transmitting station from which emanates a beam of radiant energy which is directed toward the point of departure 20 and which may be constituted by a beam transmitted by a radio range beacon. The transmitter also produces a signal which does not constitute a directional beam and which is received, for example, by a conventional radio compass.

The line of flight followed by a craft 22 represents a course resulting from the control of an automatic pilot, the craft being subject to a cross wind from the left. The vehicle maintains a constant heading but drifts away from the objective. Repeated adjustments of heading are necessary to overcome the effect of this cross wind. A second line of flight is followed by a craft 23 which is equipped in addition to an automatic pilot, such as a gyroscopic pilot, with a radio compass which includes a fixed directional antenna 24, for example, a loop antenna. The radio compass influences the automatic pilot to change the craft's heading to maintain a predetermined angular relation between the transmitter 21 and antenna 24. If a cross wind exists, the heading must be constantly changed in order to bring the craft to the desired objective. Although the heading is changed automatically by the above mechanism, it is changed only after a deviation from the true course has occurred. The path of the flight is curved and the degree of curvature is dependent upon the velocity of the cross wind.

The straight line flight followed by a craft 25 represents the course of a craft provided with the novel apparatus herein disclosed. Under this present system of control, the course is not the resultant of a series of corrections for course errors, but is a straight line, due to an instantaneous and automatic correction to the craft's heading to compensate for the cross wind. The control system described in connection with craft 23 corrects the heading only after an error has occurred, whereas the apparatus embodying the present invention initially changes the heading by a sufficient amount so that no error in course will subsequently occur, provided the cross wind velocity remains constant. A change in the wind velocity will be followed by a suitable change in heading to maintain the craft upon the straight line course.

The flight paths of the respective aircraft provided with the same control systems as above set forth are shown in Fig. 2 where the objective is away from the transmitter 21. Craft 22, provided with an automatic pilot, follows the same flight path as shown in Fig. 1. Since this craft has no radio apparatus associated with its automatic pilot, the line of flight will be the same whether the craft is approaching or leaving the transmitter. The line of flight of craft 23 of Fig. 2 is altered relative to that shown in Fig. 1 by the coaction of the radio compass upon the automatic pilot. The radio compass functions only to influence the automatic pilot to change the attitude of the craft to maintain antenna 24 in a predetermined angular relation, for example, a normal relation to transmitter 21. The radio compass performs this function in Fig. 2, but the effect of the cross wind is to blow the craft off course until it is proceeding directly with the wind. The line of flight followed by craft 25, which is provided with the present novel apparatus, is the same as that shown in Fig. 1.

In the form shown in Fig. 3, the novel steering apparatus for craft 25 comprises a conventional radio beacon receiver 26 which is adapted for receiving, for example, two signals of differing frequencies. These frequencies may be, for example, 65 and 86.7 cycles. Both signals emanate from the transmitter 21, the field of each being in the form of a figure eight. The overlapping portions of the two fields comprise the radio beam which is included between the broken lines of Figs. 1 and 2 and which is to be followed. The two signals are received with equal intensity when the craft is within the beam and with unequal intensity when outside of the beam in such a manner that it is possible to determine on which side of the beam the receiver is located.

Suitable means for operatively connecting the beacon receiver to a directional antenna and to an instrument for visually indicating whether the craft is to the left or right or on the course are provided, comprising, in the form illustrated, a double pair of coil magnets 27 and 28 which are connected with series to the receiver by means of a lead 29. A reed 30 which is tuned to vibrate at the first-named frequency is mounted at 31 with the free extremity thereof extending between magnets 27. A second reed 32 tuned to vibrate at the second frequency is mounted at 33 and extends between magnets 28. Reed 30, for a purpose to later appear, also extends between a third pair of magnets 34, which is connected by leads 35, 36 to a full wave rectifier 37. Reed 32 extends between a fourth pair of magnets 38, which is connected by leads 39, 40 to a second full wave rectifier 41. Each of the rectifiers is connected, by a pair of leads 42, 43 and 44, 45, respectively, to the input contacts 46, 47 of a conventional double-pole, double-throw reversing switch by which the direction of the flow of current in the circuit is controlled, depending upon whether the craft is approaching or moving away from the transmitter of said signals. Switch arms 48, 49, which are pivotally mounted at 50, 51, respectively, are connected by leads 52, 53, respectively, to an indicator 54 and are adapted for respectively engaging contacts 46, 47 or a second pair of contacts 55, 56 which are connected to the former pair of contacts by crossed leads 57, 58. The visual indicator 54 is provided with a pivotally mounted pointer 59 for indicating the position of the craft relative to said beam.

In order to correct the heading of the craft to compensate for a course deviation, in a manner to be set forth later, means are provided for moving in azimuth a directional antenna 60, of a radio compass 61, the means comprising, for example, a galvanometer 62 or other means adapted for controlling a beacon relay or an air turbine 63 in response to the movements of the pointer 59. Galvanometer 62 is connected to indicator 54 by leads 64, 65. A fin 66, which is operatively connected to a moving element 67 of the galvanometer, controls the direction of flow of air from a conduit 68 to an air turbine wheel 69, which in turn governs a follow-up contact arrangement 70 by means of a spur gear 71 which is mounted upon a shaft 72 upon which the turbine wheel 69 is also mounted. Gear 71 meshes with a second spur gear 73 which has one extremity of a contact arm 74 secured by means of a suitable screw 75 to a face thereof. Arm 74 is yieldingly held in a centralized position between two contacts 76, 77 by means of opposed springs 78. Contacts 76, 77 are connected to opposed fields of a servo-motor 79 by leads 80, 81, respectively. Contact arm 74 is also connected in a conventional manner to the motor by a lead 82 which is in series with a battery 83. Motor 79, by means of a worm 84 and wheel 85, is operatively connected to a shaft 86 upon which is mounted the loop or directional antenna 60 which comprises the energy collecting means for the conventional radio compass 61.

In order that the radio compass 61 may control a suitable arrangement, such as an automatic gyro-pilot which when acting alone is capable of maintaining the craft upon a constant heading, suitable means are provided for operatively connecting said compass to the automatic gyro-pilot comprising, in the form shown, an air turbine 87 which is identical to the turbine 63 and which is controlled by a galvanometer 88 having a fin 89 which controls the direction of flow of air from a conduit 90, similar to conduit 68 above mentioned. A radio compass visual indicator 91, having a pointer 91a, is employed in conjunction with galvanometer 88 for indicating the angular position of the loop antenna 60 relative to the transmitter 21, i. e. for indicating whether the plane of loop 60 is to be moved in azimuth to the right or left in order to place the loop's plane in a position perpendicular to a line passing through the transmitter.

The radio compass is connected by means of leads 92, 93 through a reversing switch 94 to the galvanometer 88, the indicator 91 being in parallel therewith through leads 95, 96. Turbine 87 governs a follow-up contact arrangement 97 by means similar to that of contact 70 above described, i. e. by means of a gear 98 which is secured to a common shaft with a turbine wheel 99 and which meshes with a gear 100 having a contact arm 101 secured thereto. Arm 101 is normally held in a central position between a pair of contacts 102, 103 by the opposed springs 104. Contacts 102, 103 are respectively connected to opposed field windings of a servo-motor 105 having a shaft 106 by means of leads 107, 108. In order that the one battery 83 may supply energy not only to motor 79 but also to the second motor 105, the contact arm 101 is connected to one side of the battery, the other side being connected by a lead 109 to the second servo-motor.

The servo-motor 105 governs a suitable gyro-pilot 110, in the form shown, by controlling the position of an air pick-off element 111 relative to a directional gyro 112 which is mounted in suitable gimbal rings (not shown). A worm 113 upon the motor shaft 106 meshes with a gear 112 upon a shaft 114 upon which is mounted a worm 115 which in turn meshes with a gear sector 116 secured to the pick-off element 111. The directional gyro is rotatably mounted within a suction box 117 which is fixedly mounted upon the vehicle and into which air is drawn through a screened port 118 therein, by means of a suction pump 119, the air being directed against the rotor or gyro 112 by suitable means (not shown), thereby causing rotation in the manner of an air turbine. The air pick-off element comprises two conduit sections 120 which pass through and are rigidly attached to the angularly shiftable common mounting 111 and arranged so that the mouth of each section is partially closed, for example, half closed, by portions 121, respectively, secured to the gyro mounting, when the craft is upon the desired heading. When the mouth of each section is equally obstructed, as shown in Fig. 3, the pressure in each is equal. An air relay 122, having a diaphragm or flexible membrane 123 forming two chambers 124 and 125 within a container 126, is in communication with the pick-off sections 120 by means of conduits 127, 128 which enter the container on opposite sides of diaphragm 123 in chambers 124 and 125, respectively. Air intake ports 129, 130 are provided in chambers 124, 125, respectively. Diaphragm 123 is operatively connected by means of a shaft 131 to a fluid servo-motor control valve 132 comprising four pistons upon a single shaft 133 which moves within a cylinder 134 having a pressure agent inlet 135 and exhaust ports 136, 137, 138 and 139. The ports 137, 138 are connected by conduits 140, 141 to a fluid servo-motor 142 having a piston 143 upon a rod 144. A manually controllable by-pass valve 145 is provided which, when open, renders the apparatus inoperative by placing chambers 146 and 147 on opposite sides of the piston 143 in communication with one another through a by-pass conduit 148. The valve 145 is opened when the human pilot controls the craft. Rod 144 governs the position of a control surface 149 by means of cables 150, 151.

In order that the rudder 149 may be returned to a neutral position when the proper heading has been reached, a suitable follow-up arrangement is provided comprising in the form shown a cable 152 which, at one extremity thereof, is connected to rod 144, the opposite extremity being connected to a pulley 153 upon the shaft 106.

In operation, when the craft is "on course," the pointers of the indicators 54 and 91 are centrally disposed, the plane of the directional loop antenna 60 is perpendicular to a line extending to the transmitter 21 and the craft is "riding the beam," i. e. is centrally following the overlapping fields of the signals having the two differing frequencies. When following the beam, the two reeds 30 and 32 respond to the signals by vibrating with equal intensities. Equal voltages are set up in the two pairs of magnets 34 and 38 and the pointer 59 indicates "on course." However, if a cross wind occurs, or if for any reason the craft is forced from the straight line course, the beacon receiver will move out of the radio beam, the plane of antenna 60 will lose the above-mentioned perpendicular relation, and the heading of the craft will change in the direction of the cross wind. At this point, three actions occur simultaneously. First, the air pick-off sections 120 move relative to gyro 112, which produces a difference in the size of the opening at the mouths of these sections. A pressure differential occurs between the chambers 124, 125. The diaphragm 123 is displaced, thus moving control valve 132 in a proper direction to actuate motor 142 to restore the craft to its original heading. Second, the loss of the perpendicular relation of the plane of loop antenna 60 to the line extending to the transmitter will cause the pointer 91a to indicate the proper direction in which the heading of the craft should be changed to restore this relation. Galvanometer 88 will automatically angularly shift the fin 89, causing the turbine 87 to rotate. Arm 101 will be displaced, against the pressure of the springs 104, from its central position, thus energizing the servo-motor 105 which in turn will change the position of the air pick-off element 111 in such a direction that the rudder 149 will be further moved, whereby an added correction to the craft's heading will be applied to restore said perpendicular relation. Third, the movement of the beacon receiver away from the radio beam will cause one of the two signals to be received with a greater intensity than the other. Consequently, one of the reeds 30 or 32 will vibrate with greater intensity than the other. This difference in intensity will cause pointer 59 to move correspondingly to the right or left and therefore fin 66 will be tilted by galvanometer 62 from its normally centralized position relative to the air jet from pipe 68. The turbine wheel 69 will rotate, the arm 74 will be displaced against the pressure of springs 78, and will close contact with one of the contacts 76 or 77, thus energizing motor 79. The loop antenna 60 will be shifted in azimuth in the same direction in which the first change of heading occurred, i. e. in such a direction that the azimuth correction to the loop will prolong the period of energization of motor 105 by means of the radio compass and the associated follow-up contact arrangement 97. Motor 105 therefore will further shift the air pick-off element 111 and thus will cause the craft's heading to be shifted an added amount in order to restore the perpendicular relation between the plane of the loop and a line to the transmitter. This added change in heading will constitute a full compensation for the cross current and the craft will be headed into the wind a sufficient amount to fully counteract the drift which otherwise would occur. The antenna is angularly shifted until the craft is again upon the beam, thus an angular correction is applied thereto in response to the force of the cross current. When the craft regains the beam, the beacon or beam receiver ceases to act upon the antenna 60 and the contact arm 74 is centralized. The automatic pilot and the remainder of the apparatus is therefore restored to a neutral condition when said beam is regained and when said perpendicular relation is restored.

There is thus provided a novel automatic steering apparatus which instantaneously and positively corrects the heading of a vehicle, such as an aircraft, to compensate for the effect of a cross wind. The device is effective to introduce a single heading correction which will be sufficient to maintain the craft upon a desired straight line course so long as the velocity of the cross wind remains constant. The device, however, will quickly alter the heading to compensate for any changes in cross wind velocity. The present apparatus further relieves the pilot of the physical burden of maintaining the craft on the course. In the case of aircraft, this relief will permit the attention of the pilot to be devoted to navigation, observation or radio communication. The apparatus is particularly useful under conditions where blind flying is necessary as it prevents the fatigue which is commonly associated with long periods of manual control by instruments. Furthermore, the navigation of aircraft by celestial sights is a very important consideration on long over-water flights. With the present novel apparatus controlling the craft, sights can be obtained with an accuracy which is otherwise impossible.

Although only one embodiment of the present invention has been illustrated and described in detail, it is to be expressly understood that the invention is not limited thereto. For example, in the form shown, an automatic gyro-pilot of the Sperry type is employed which, when uninfluenced by the associated apparatus, will maintain the craft upon a constant heading; however, any suitable automatic means which perform the same function, such as a tele-magnetic compass, may be employed. Various changes may also be made in the design and arrangement of the parts without departing from the spirit and scope of the invention, as the same will now be understood by those skilled in the art. For a definition of the limits of the invention, reference will be had primarily to the appended claims.

What is claimed is:

1. Apparatus adapted for use on a navigable vehicle comprising an energy collecting means having a normal angular relation to a source of radiated energy and to the longitudinal axis of the vehicle, means for automatically keeping the vehicle upon a predetermined heading, means for producing an impulse in response to the energy collected by said collecting means, means for adjusting said heading in response to said impulse whereby said normal angular relation is maintained, and means operable independently of the energy collected by said collecting means and responsive to deviations of the vehicle from a predetermined course for angularly displacing said collecting means from its normal relationship to the longitudinal axis of the vehicle.

2. The combination on a navigable vehicle of energy collecting means, means for receiving the energy collected by said collecting means, the energy so received being a function of the angular relation of said collecting means to an energy transmitter, means for retaining the vehicle upon a predetermined heading, means for adjusting the last-named means in response to said energy so received to maintain a predetermined angular relation between said collecting means and said transmitter, means for receiving a radio beam, and means operable when said vehicle moves out of said beam for angularly displacing said collecting means.

3. In apparatus of the class described, energy collecting means adapted to be mounted upon a vehicle, means for receiving the energy collected by the collecting means, the energy so received being a function of the angular relation of said collecting means to an energy transmitter, means for retaining the vehicle upon a predetermined heading, means for adjusting the last-named means in response to said energy so received whereby a predetermined angular relation between said transmitter and said collecting means is maintained, and means operable independently of energy collected by said collecting means and responsive to a change in the bearing of said vehicle relative to said transmitter for changing the angular relation of said collecting means to said transmitter.

4. In combination on a vehicle, a directional collector of radiant energy, means for receiving a beam of directionally propagated radiant energy, means for controlling the angular position of said collector solely in response to energy received by said first-named means from a radio range beacon transmitter, and steering means for the vehicle controlled in accordance with energy received by said collector.

5. In combination on a vehicle, a rotatably mounted directional antenna, means for rotating said antenna, means including a receiver of radiant energy for controlling the first-named means solely in accordance with energy received by said receiver from a transmitter of directionally propagated radiant energy, and steering means for the vehicle controlled in accordance with energy received by said antenna.

6. Apparatus adapted for use on a navigable vehicle comprising a directional receiver of radiant energy, means operatively connected to said receiver for controlling the heading of said vehicle in response to energy received by said receiver from a transmitter of radiant energy, beam receiving means for a beam of radiant energy, and means for adjusting said directional receiver in response to off-course signals from said beam receiving means.

7. Control apparatus for a mobile craft comprising means including a directional antenna for determining the bearing of said craft with respect to a transmitter of radiant energy, means responsive to energy collected by said antenna for steering said craft, means for detecting a departure of said craft from the line of a directively propagated beam of radiant energy, and means controlled by said last-named means for moving said antenna angularly relative to said craft.

8. Control apparatus for a mobile craft comprising means including a directional collector of radiant energy transmitted from a transmitter of radiant energy, means independent of said first-named means for detecting a departure of said craft from a directively propagated radio beam, and means controlled by said second-named means for angularly adjusting said collector relative to said craft.

9. Control apparatus for a mobile craft comprising directional means for collecting radiant energy, means for detecting a departure of the craft from the equi-signal zone of a plurality of directionally propagated fields of radiant energy, and means controlled by said detecting means for adjusting the position of said directional means relative to said craft.

10. Control apparatus for a mobile craft comprising directional means for collecting radiant energy, means for detecting a departure of the craft from the equi-signal zone of a plurality of directionally propagated fields of radiant energy, means controlled by said detecting means for adjusting the position of said directional means relative to said craft, and means operable in accordance with the energy collected by said directional means for varying the heading of the craft.

11. In apparatus of the class described for use on a mobile craft, a directional antenna for collecting radiant energy, and means for receiving directionally propagated radiant energy and operative when the craft deviates from a course determined by said directively propagated energy to vary the angular position of said antenna relative to the craft.

12. In apparatus of the class described for use on a mobile craft, a directional antenna for collecting radiant energy, means for receiving directionally propagated radiant energy and operative when the craft deviates from a course determined by said directively propagated energy to vary the angular position of said antenna relative to the craft, and means operable in accordance with the energy collected by said antenna for varying the heading of the craft.

CARL J. CRANE.
RAYMOND K. STOUT.